United States Patent [19]

Tazaki

[11] Patent Number: 4,583,100
[45] Date of Patent: Apr. 15, 1986

[54] MULTICOLOR SERIAL DOT PRINTER

[75] Inventor: Shigemitsu Tazaki, Matsudo, Japan

[73] Assignee: Canon Kabushiki Kaisha, Tokyo, Japan

[21] Appl. No.: 771,154

[22] Filed: Aug. 30, 1985

Related U.S. Application Data

[63] Continuation of Ser. No. 716,510, Mar. 25, 1985, abandoned, which is a continuation of Ser. No. 442,361, Nov. 17, 1982, abandoned.

[30] Foreign Application Priority Data

Dec. 28, 1981 [JP] Japan .................................. 56-210269
Dec. 28, 1981 [JP] Japan .................................. 56-210270

[51] Int. Cl.$^4$ ............................................. G01D 9/28
[52] U.S. Cl. ......................................... 346/46; 358/75
[58] Field of Search ......................... 346/46; 400/126; 358/78, 258, 303, 75

[56] References Cited

U.S. PATENT DOCUMENTS 4,320,419  3/1982  Cottrail ................................ 358/258
4,334,240  6/1982  Franklin ................................. 358/78
4,403,874  9/1983  Payne .................................... 358/303
4,413,275 11/1983  Horiuchi ................................ 358/78

Primary Examiner—E. A. Goldberg
Assistant Examiner—Mark Reinhart
Attorney, Agent, or Firm—Fitzpatrick, Cella, Harper & Scinto

[57] ABSTRACT

A multicolor serial dot printer has memories for storing printing data, which memories number the same as the recording colors. A bar graph, for example, is printed in staggered patterns and numerals and the like are superposed on it. For printing in black and red, for example, the graph data to be printed in red is stored in a memory, while the numeral data to be printed in black is stored in another memory. A control section controls read/write operations of the printing data into and from the memories, and also controls the operation of a printer control section. Under the control of the control section, the printer control section drives ink jet nozzles to print in accordance with the printing data read out from the memories. The printed graph is easy to see, and printing paper sheets are saved.

17 Claims, 21 Drawing Figures

FIG. 1
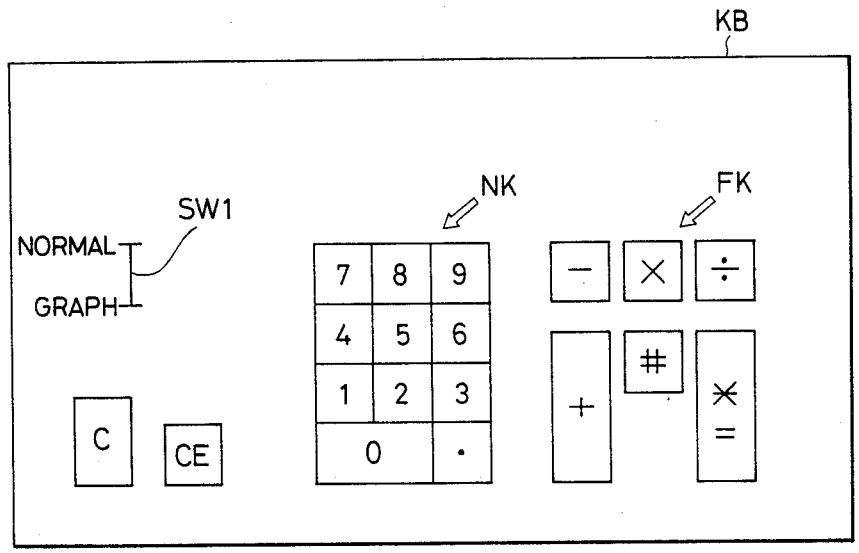
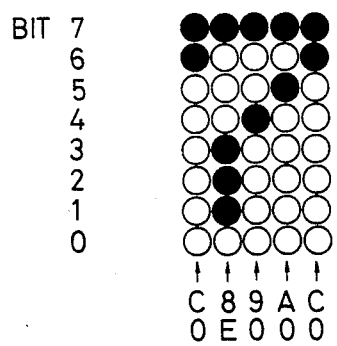
FIG.4(A)
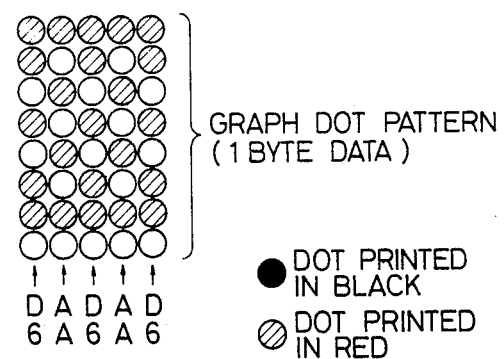
FIG.4(B)

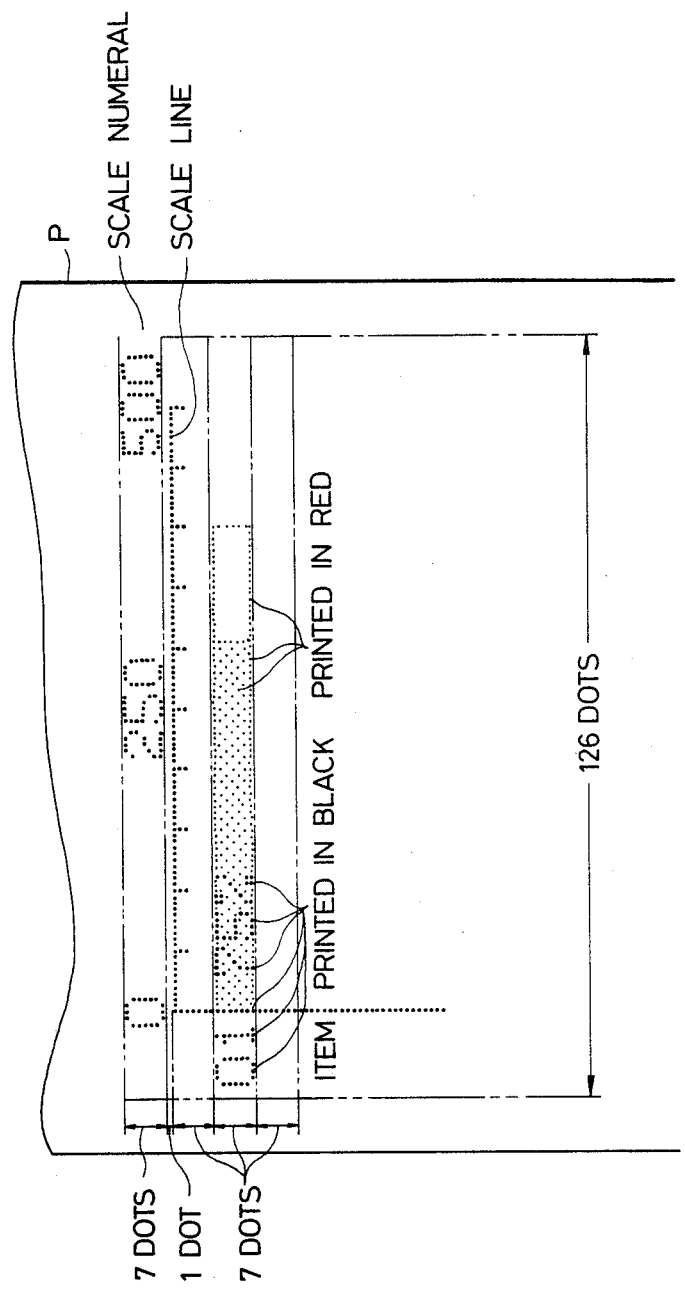

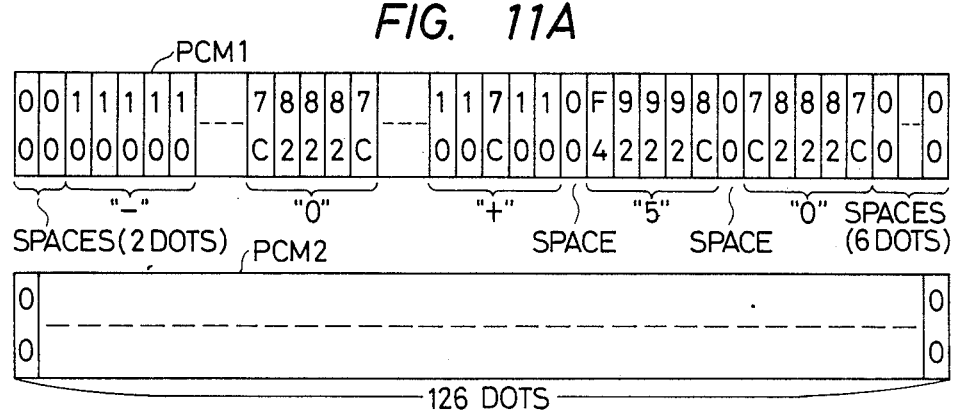
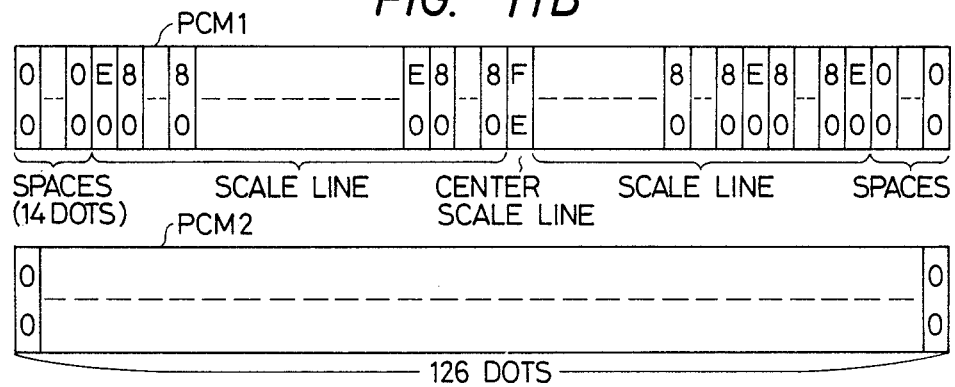
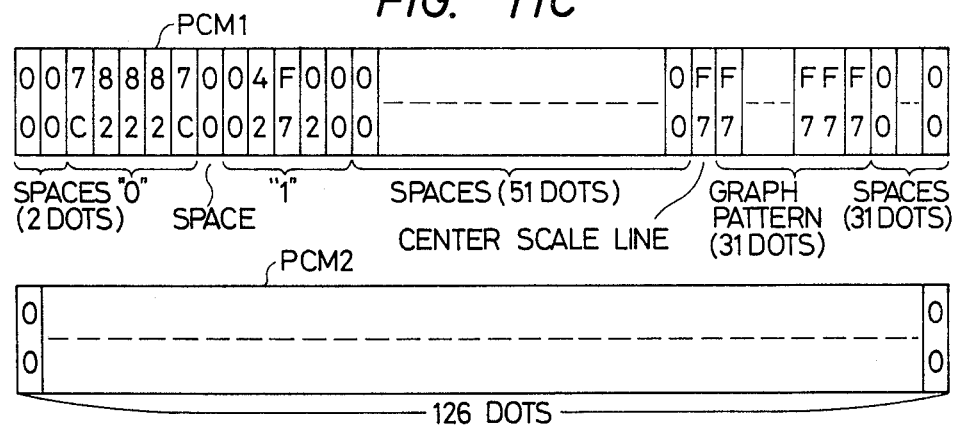

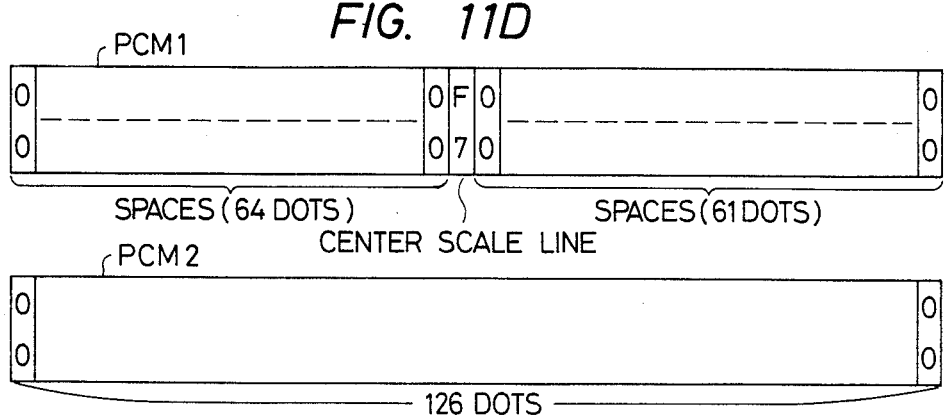
FIG. 11D
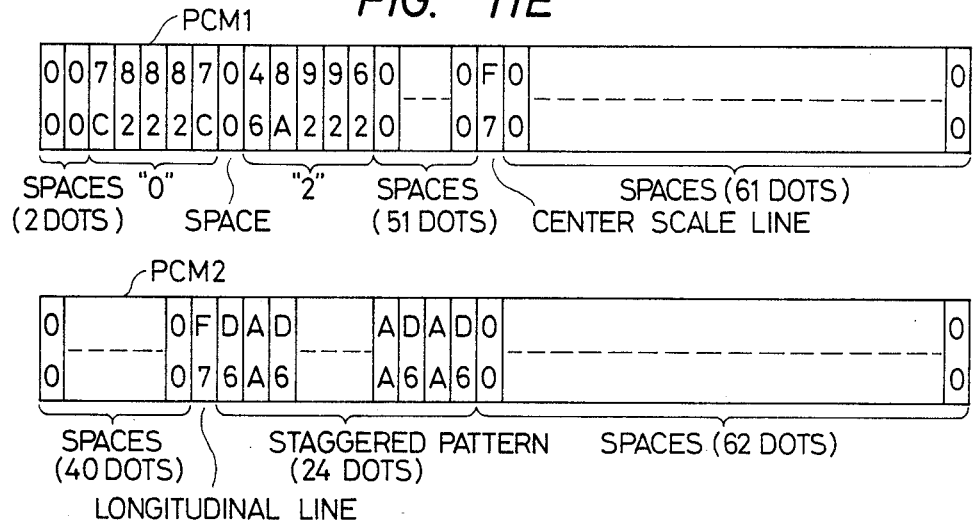
FIG. 11E
FIG. 12
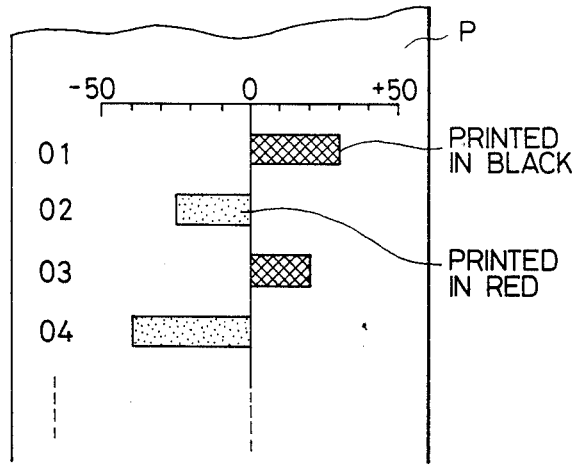

MULTICOLOR SERIAL DOT PRINTER

This application is a continuation of application Ser. No. 716,510 filed Mar. 25, 1985, now abandoned, which was a continuation of Appln. Ser. No. 442,361, filed Nov. 17, 1982, now abandoned.

BACKGROUND OF THE INVENTION

1. Field of the Invention

The present invention relates to a multicolor serial dot printer and, more particularly, to a multicolor serial dot printer which is simple in construction, allows multicolor printing and printing which is easy to recognize, and economizes on printing paper sheets.

2. Description of the Prior Art

In a conventional multicolor serial dot printer, memories for storing printing data have some difficulties in configuration, moreover, it is hard to control fetch of the memory contents and requires an increased number of program steps.

The conventional multicolor serial dot printer is also unsatisfactory in easy recognition of printed data, especially of graph data.

SUMMARY OF THE INVENTION

It is an object of the present invention to solve the problems described above.

It is another object of the present invention to provide a printer having memories of which number is corresponding to that of printing colors.

It is still another object of the present invention to provide a printer which allows easy recognition of graph and other printed data.

BRIEF DESCRIPTION OF THE DRAWINGS

FIG. 1 is a plan view showing an example of arrangement of a keyboard in a calculator with a printer according to the first embodiment of the present invention;

FIG. 3 is a view showing a dot configuration of a graph printed by the first embodiment of the present invention;

FIGS. 4(A) and 4(B) are views showing examples of dot configuration of individual characters printed by the first embodiment of the present invention;

FIGS. 11A to 11E are views showing examples of contents of printing memories in the second embodiment of the present invention; and FIG. 12 is a view showing an example of data printed by the second embodiment of the present invention.

DETAILED DESCRIPTION OF THE PREFERRED EMBODIMENTS

FIG. 1 shows a keyboard of a calculator having a dot printer according to the first embodiment of the present invention. A keyboard KB has a slide switch SW1 for selecting either the normal printing mode and the graph printing mode, in addition to numeral keys NK and function keys FK.

Figure 2:
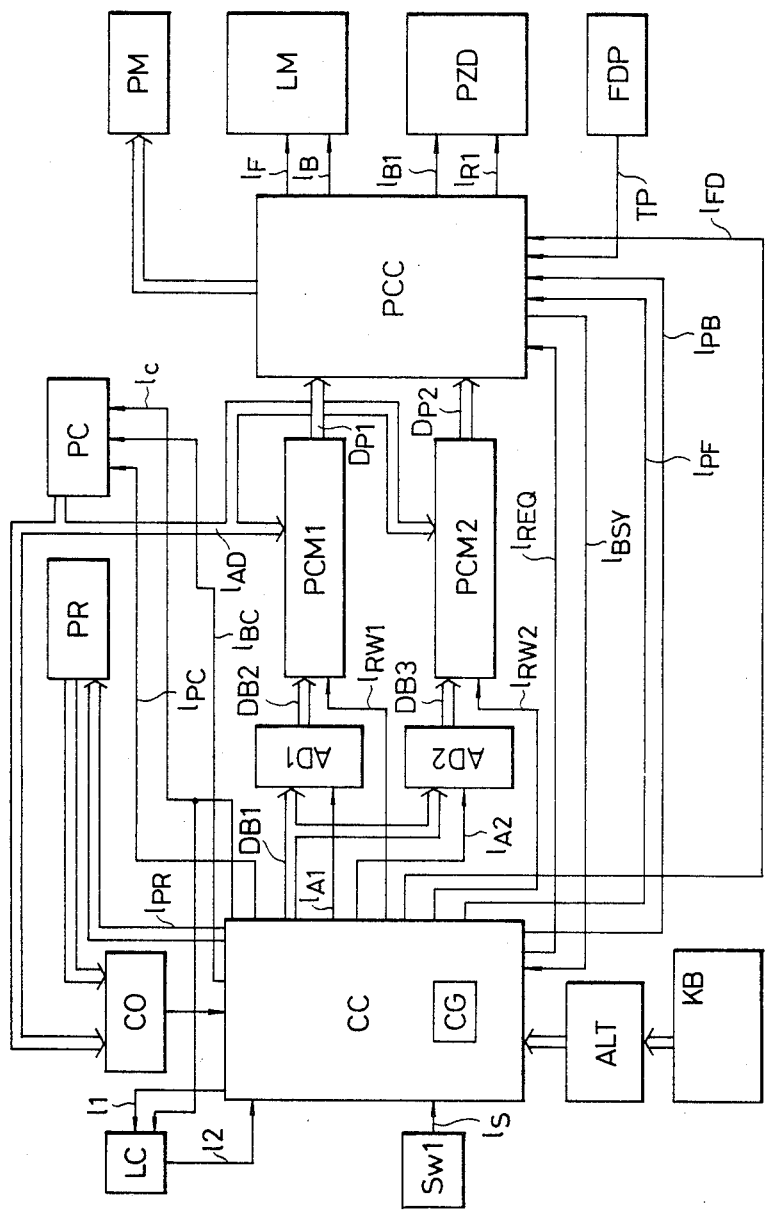
FIG. 2 is a block diagram showing the overall configuration of the first embodiment of the present invention.

FIG. 2 is a block diagram of the first embodiment of the present invention. The calculator basically has a control section CC for controlling the overall system, printing memories PCM1 and PCM2 for storing printing data, and a printer control section PCC for controlling the printer. The printer is a serial dot printer which has ink jet nozzles for printing in black and red, respectively, which are mounted horizontally, on a carriage driven by a linear motor. A driver circuit PZD drives piezoelectric elements constituting the ink jet nozzles. The piezoelectric elements corresponding to black and red, respectively, are driven through signal lines $l_{B1}$ and $l_{R1}$, and black and red ink are injected from the nozzles.

When the slide switch SW1 of the keyboard KB in FIG. 1 is switched from the normal printing mode to the graph printing mode, the control section CC detects this through a signal line $l_S$. Then, the function keys FK on the keyboard KB are prepared for graph data input. The graph is performed by groups of dots. Each line of the graph comprises a matrix of 126×7 dots, as shown in FIG. 3. Each of the printing memories PCM1 and PCM2 in FIG. 2 has a capacity of 126 bytes, each byte comprising 8 bits corresponding to 1×7 dots of the line data. The printing memory PCM1 is assigned for printing in black, while the printing memory PCM2 is assigned for printing in red, thereby allowing printing in black and red.

In order to print a graph which represents both target values and actual obtained values, designating 500 as a maximum value of a scale, the numeral 500 is input through the keyboard KB; a function key FK for modifying the input data as a scale numeral on the scale, such as a key ⌗ , is depressed; and then, the control section CC judges first that the input data is to be printed as the scale numeral. Dot patterns representing the input numeral 500, the numeral 250 obtained by dividing it by two, and the numeral 0 are stored in the printing memory PCM1 together with dot patterns representing spaces. Dot patterns representing spaces are stored in the printing memory PCM2. These operations are performed in the following manner. Firstly, the numeral 125 is set in a printing dot register PR through a signal line $l_{PR}$. A printing dot counter PC and a line counter LC are cleared through a signal line $l_C$. An output signal line $l_{AD}$ of the dot counter PC is an address signal line for the printing memories PCM1 and PCM2. A signal line $l_{A1}$ is set to logic level "1" to open an AND gate AD1 so that printing data on a data signal line DB1 may appear on a signal line DB2. This printing data is stored in the printing memory PCM1 by setting a read/write signal line $l_{RW1}$ for black to logic level "0". The contents of the printing dot register PR and the printing dot counter PC are compared. If they do not coincide, the count of the dot counter PC is incremented by one through a signal line $l_{PC}$, and the next printing data of 7 dots is stored in the printing memory PCM1. This operation is repeated until the contents of the printing dot counter PC and the printing dot register PR coincide, thereby storing the graph data of 126 bytes.

Meanwhile, 126-byte printing data of logic level "0", that is, the dot patterns representing spaces, are also stored in the printing memory PCM2 by setting a signal line $l_{A2}$ to logic level "0" to close an AND gate AD2 and by setting a read/write signal line $l_{RW2}$ for red to logic level "0".

The printing data is stored in the printing memories PCM1 and PCM2 in units of bytes, each byte comprising 8 bits corresponding to printing data of $1 \times 7$ dots. The printing data is dot pattern data generated by a character generator CG in the control section CC. Each dot pattern of $1 \times 7$ dots is expressed in hexadecimal notation. Illustrating a numeral "7" and a staggered pattern as shown in FIG. 3, the numeral "7" is represented by "C0", "A0", "90", "8E" and "C0" from the right in hexadecimal notation as shown in FIG. 4(A), while the staggered pattern is represented by "D6", "AA", "D6", "AA", and "D6" as shown in FIG. 4(B). In FIGS. 4(A) and 4(B), black circles represent dots printed in black, while hatched circles indicate dots printed in red.

Figure 5A:
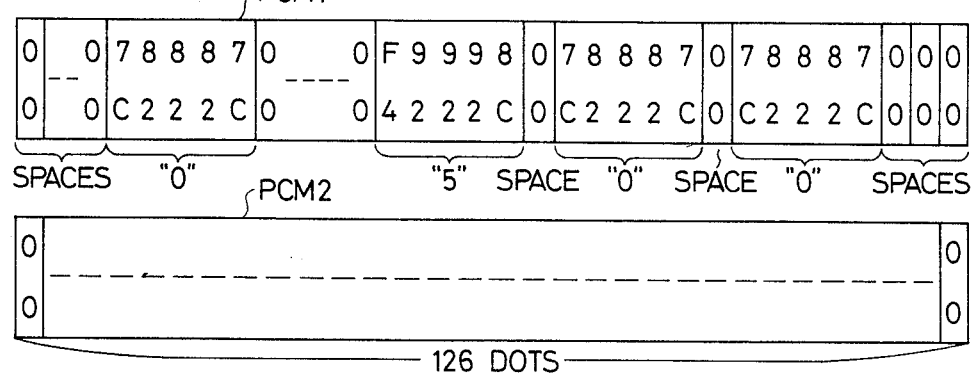
FIGS. 5A to 5C are views showing examples of contents of printing memories in the first embodiment of the present invention.

In the case of scale numerals under discussion, data of numerals 500, 250 and 0 is printed. The contents of the printing memories PCM1 and PCM2 have formats as shown in FIG. 5A. The printing data stored in the printing memories PCM1 and PCM2 is transferred to the printer control section PCC and the printer is operated to perform printing.

The mode of operation will now be described with reference to FIG. 3. In the first embodiment, the printer is an ink jet printer wherein paper feed is performed by a pulse motor PM, ink jet nozzles of the on-demand type for printing in black and red are horizontally mounted on a carriage which is driven by a linear motor LM, and the piezo driver circuit PZD is driven by a timing pulse TP generated by a carriage position sensor FDP during reciprocative movement of the carriage.

When the printing data is stored in the printing memories PCM1 and PCM2 in this manner, the control section CC clears the printing dot counter PC and the line counter LC to initialize the addresses of the printing memories PCM1 and PCM2 by setting the signal line $l_C$ to logic level "0". After setting the black and red read/write signal lines $l_{RW1}$ and $l_{RW2}$ logic level "1" (read state) and confirming that a busy signal line $l_{Bsy}$ from the printer control section PCC is at logic level "1" (not in the busy state), the control section CC sets a signal line $l_{PF}$ to logic level "1" and a signal line $l_{PB}$ to logic level "0" so as to instruct the printer control section PCC to start printing. Then, the printer control section PCC sets the busy signal line $l_{Bsy}$ to logic level "0" (busy state), sets a drive signal line $l_F$ of the linear motor LM to logic level "1", and sets a drive signal line $l_B$ to logic level "0" so as to drive the carriage toward the left from its home position (right-hand position on a printing paper sheet P). During this time period, the timing pulses TP from the carriage position sensor FDP are detected. In response to the timing pulse immediately next to that corresponding to the printing start position, the printer control section PCC sets the signal line $l_{Bsy}$ to logic level "1" so as to signal to the control section CC that the printing data may be transmitted. In response to this, the control section CC sets a signal line $l_{REQ}$ to logic level "0" to signal to the printer control section PCC that the data on data lines $D_{p1}$ and $D_{p2}$ is valid. Then, the printer control section PCC sets the signal line $l_{Bsy}$ to logic level "0" (busy state) to read the printing data from the printing memories PCM1 and PCM2. In response to the next timing pulse TP, the piezo driver circuit PZD is driven through the signal lines $l_{B1}$ and $l_{R1}$ to print in black and red in accordance with the state of the most significant bit of the first byte of $1 \times 7$ dots. Since the printing data is "00" for black and red as shown in FIG. 5A, a space is printed. When this printing is completed, the printer control section PCC sets the signal line $l_{Bsy}$ to logic level "1" to signal to the control section CC that the next printing data may be transmitted. Then, the control section CC increments the printing dot counter PC by one through the signal line $l_{PC}$, and then increments the addresses of the printing memories by one. The next printing data is supplied to the data signal lines $D_{P1}$ and $D_{P2}$. The control section CC sets the signal line $l_{REQ}$ to logic level "0" to indicate that the data on the data signal lines $D_{P1}$ and $D_{P2}$ is valid. The printer control section PCC reads the data from the printing memories PCM1 and PCM2 and performs printing in response to the next timing pulse.

In this manner, the data of the most significant bit of each byte of $1 \times 7$ dots of black and red printing data (first row of one $126 \times 7$ dot matrix) shown in FIG. 5A is printed to the left. During this time period, a coincidence circuit CO monitors coincidence between the contents of the printing dot counter PC which is incremented by one upon every printing operation and of the printing dot register PR. When coincidence occurs, the control section CC detects completion of printing of first 126 dots, clears the contents of the printing dot register PR through the signal line $l_{PR}$, and sets the signal lines $l_{PF}$ and $l_{PB}$ to logic levels "0" and "1", respectively.

Subsequently, the printer control section PCC sets the busy signal line $l_{Bsy}$ to logic level "0", and the drive signal lines $l_F$ and $l_B$ to logic levels "0" and "1", respectively so as to drive the carriage to the right and to start printing to the right. The pulse motor PM is driven to feed the printing paper sheet by one dot pitch. As in the case of printing to the left, in response to the timing pulse immediately next to that corresponding to the printing start position, the printer control section PCC sets the busy signal line $l_{Bsy}$ to logic level "1" to signal to the control section CC that the printing data may be transmitted. The control section CC then sets the signal line $l_{REQ}$ to logic level "0" to indicate that the initial data for printing the second row of the $126 \times 7$ dot matrix to the right, that is, the 126th dot, is valid. Then, the printer control section PCC receives the printing data and executes printing in response to the next timing pulse TP. Thereafter, the printer control section PCC sets the busy signal line $l_{Bsy}$ to logic level "1" to indicate that the next printing data may be transmitted. Since the next printing must be performed to the right-hand side, the control section CC decrements by one the count of the printing dot counter PC to thereby decrement the printing memory addresses by one through a signal line $l_{BC}$. The control section CC transfers the data of the 125th dot to the data lines $D_{P1}$ and $D_{P2}$, sets the signal line $l_{REQ}$ to logic level "0", and performs printing in response to the next timing pulse TP. In this manner, the second row of the $126 \times 7$ dot matrix of black and red printing data is printed to the right. As in the case of printing the first row, when the coincidence of the printed dot number with 126 dots is detected by the coincidence circuit CO, the control circuit CC increments by one the count of the line counter LC through a signal line $l_1$. An output signal line $l_2$ of the line counter LC is for detecting if four reciprocative printing operations of the carriage have been completed, that is, if one line has been printed. Since only one reciprocative movement has been completed in this case, no output is produced from the output signal line $l_2$ in this case. The control section CC sets the printing dot register PR to 125, and sets the signal lines $l_{PF}$ and $l_{PB}$ to logic levels "1" and "0" to instruct printing of the third row of the 126×7 dot matrix. In response to this, the printer control section PCC sets the busy signal line $l_{Bsy}$ to logic level "0" to perform paper feed of one dot pitch and sets the drive signal lines $l_F$ and $l_B$ of the linear motor LM to logic levels "1" and "0" to perform printing to the left. The printing direction is reversed when the coincidence circuit CO detects another coincidence of the printed dot number with 126 dots. In this manner, four reciprocative movements of the carriage, that is, printing of one line, are completed. When printing of one line is completed, the control section CC receives an output from the output signal line $l_2$ of the line counter LC to thereby detect that the 126×7 dot matrix, or one line, is completed.

Figure 5B:
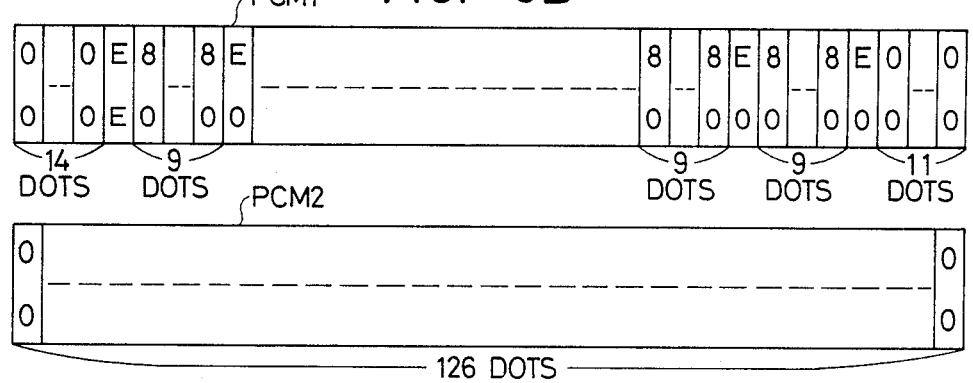

Since the scale numerals have been printed, the control section CC, referring to a signal line $l_{FD}$, instructs the printer control section PCC, through a signal line $l_{FD}$, to perform the paper feed of one dot pitch. In response to this, the printer control section PCC performs paper feed of one dot pitch. Subsequently, the control section CC stores the data of the scale lines to the printing memories PCM1 and PCM2, as shown in FIG. 5B. Since printing of the scale lines involves only printing in black, data of logic level "0" is stored in the printing memory PCM2 corresponding to printing in red. In the same manner as printing of the scale numerals, printing of the contents in the printing memory PCM1 corresponding to printing in black is executed by four reciprocative movements of the carriage, thus completing scale printing instructed by input through the keys [5], 0, [0], [≛].

The graph printing data is then input by, for example, the keys [4], [0], [0], and [⊞] as a target value, and keys [3], [0], [0], [⊞], and [≛] as an actually obtained value. Then, the control section CC recognizes that graph printing is to be performed and calculates the printing position of a bar for the input numeral 400 reference to the maximum scale numeral 500. In this case, as shown in FIG. 3, the maximum scale numeral 500 corresponds to the 100th dot (from the scale numeral 0 in the direction toward the right) and 400 therefore corresponds to the 80th dot from the scale numeral 0. Therefore, the printing position of the bar for 400 within the 126-dot row is the 32nd dot after 31 spaces from the right-hand side of the printing paper sheet P. The numeral 100 obtained by subtracting the actually obtained numeral 300 from the target value 400 corresponds to a width of 20 dots, and this portion is printed in a different pattern than is the bar portion of the actually obtained numeral 300. This portion corresponding to 100 dots is printed in red and hollow, while the bar portion corresponding to the actual obtained value 300 (60 dots) is also printed in red but in a staggered pattern. The corresponding printing data is stored in the printing memory PCM2.

Figure 5C:
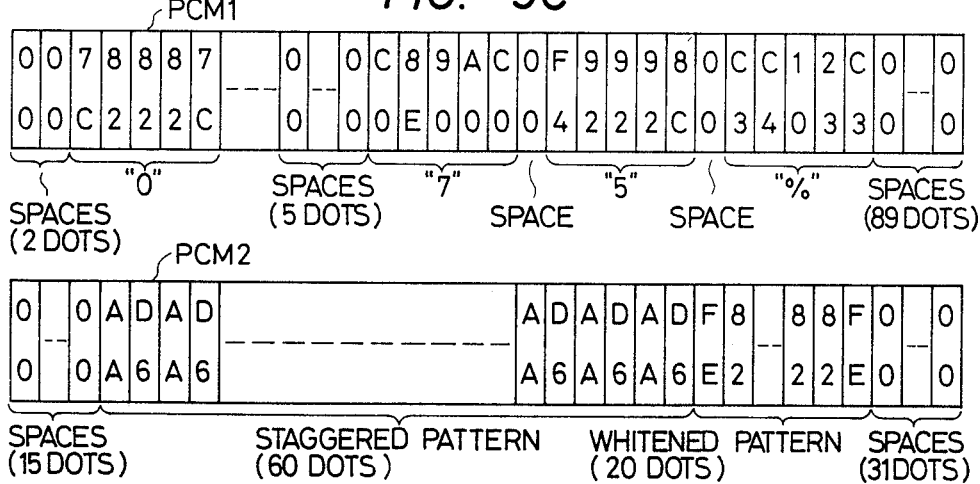

The percentage 75% obtained by dividing the actually obtained value 300 by the target value 400 is to be printed in black and the data on this is stored in the printing memory PCM1 for printing in black together with a two-digit item 01. These pieces of data are stored in the printing memory PCM1 such that the percentage 75% and the item 01 may be printed at suitable positions with spaces therebetween. In this embodiment, the symbol "%" is stored from the 90th dot after 89 dots from the right-hand side, and the subsequent data is stored in the order of one space, numeral 5, one space, numeral 7, five spaces, one scale line (corresponding to zero), two spaces, numeral 1, two spaces, numeral 0, and two spaces, as shown in FIG. 5C.

When the graph data is stored in the printing memories PCM1 and PCM2, the control section CC performs four reciprocative movements of the carriage in the same manner as in printing the scale numerals so as to perform graph printing. As described above, the data on the percentage 75%, the scale lines and the item 01 are stored in the printing memory PCM1 for printing in black, while data on the staggered pattern of the actually obtained value and the hollow pattern of the difference between the reference value and the actually obtained value is stored in the printing memory PCM2 for printing in red. Since printing is performed at the same positions within the 126×7 dot matrix, printing of the graph and the data superposed on each other as shown in FIG. 3 may be performed. The item 01 in FIG. 6 shows the printed state.

Figure 6:
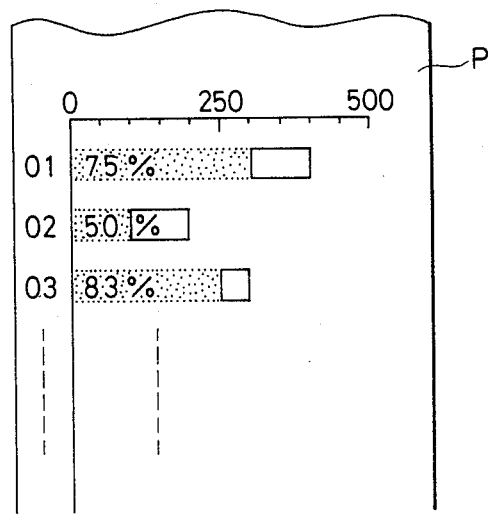
FIG. 6 is a view showing an example of data printed by the first embodiment of the present invention.

In a similar manner, the keys [2], [0], [0], and [⊞] as a target value, and the keys [1], [0], [0], [⊞], and [≛] as an actually obtained value are input to perform printing of item 02 shown in FIG. 6. The keys [3], [0], [0], and [⊞] as a target value and the keys [2], [5], [0], [⊞], and [≛] as an actually obtained value are input to perform printing of item 03 shown in FIG. 6. The numbers of these items 01 to 03 are produced by the counter inside the control section CC.

According to this embodiment, since the data necessary for understanding of a graph, such as numeral data, may be printed superposed on the graph, which has a staggered pattern, visual recognition of the graph and accompanying data on a narrow printing paper sheet P may be facilitated. This also results in economizes in the number of printing paper sheets required.

FIGS. 7 to 12 show the second embodiment of the present invention.

Figure 7:
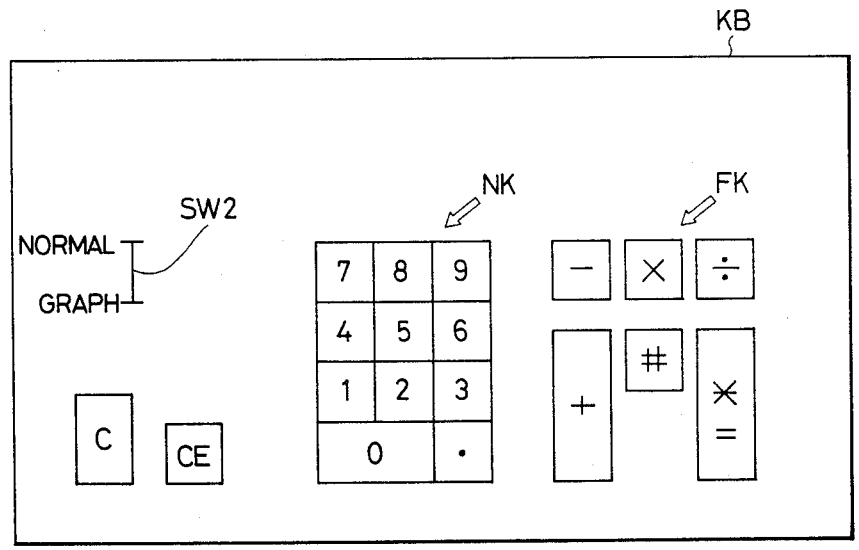
FIG. 7 is a plan view showing an example of a keyboard utilized in a device with a printer according to the second embodiment of the present invention.
Figure 8:
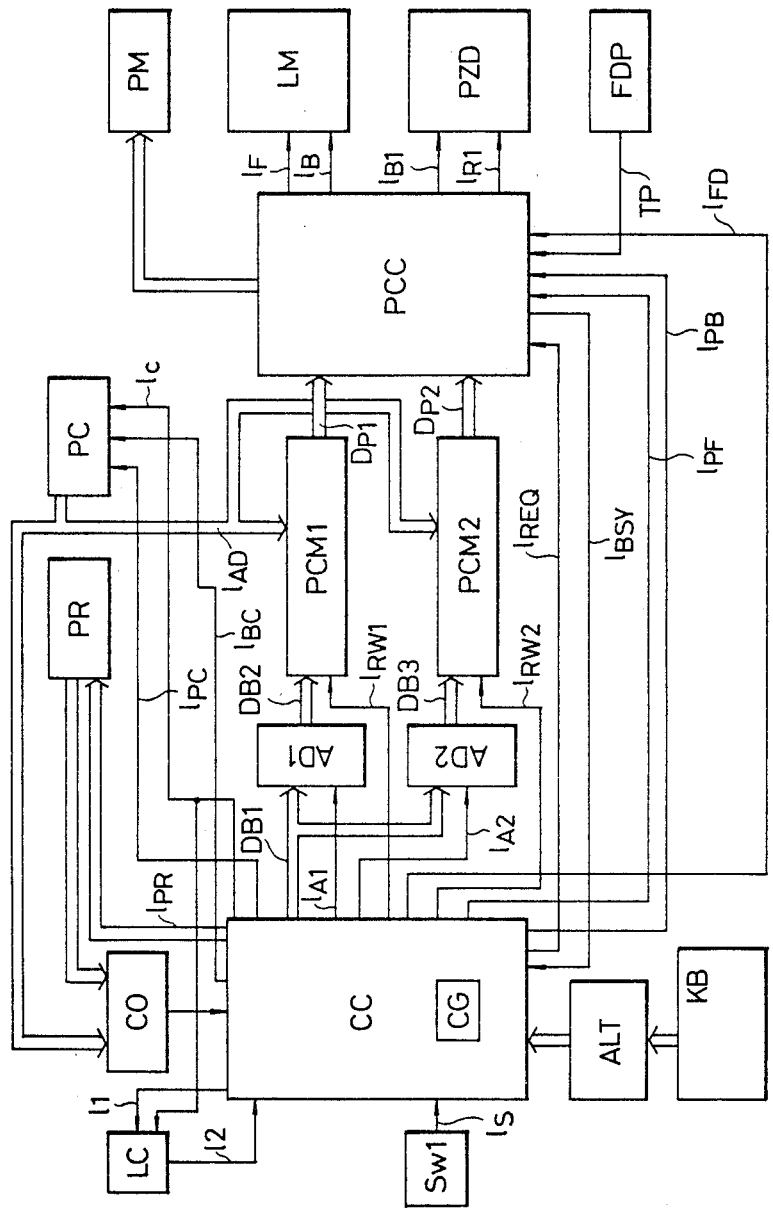
FIG. 8 is a block diagram showing overall configuration of the second embodiment of the present invention.
Figure 9:
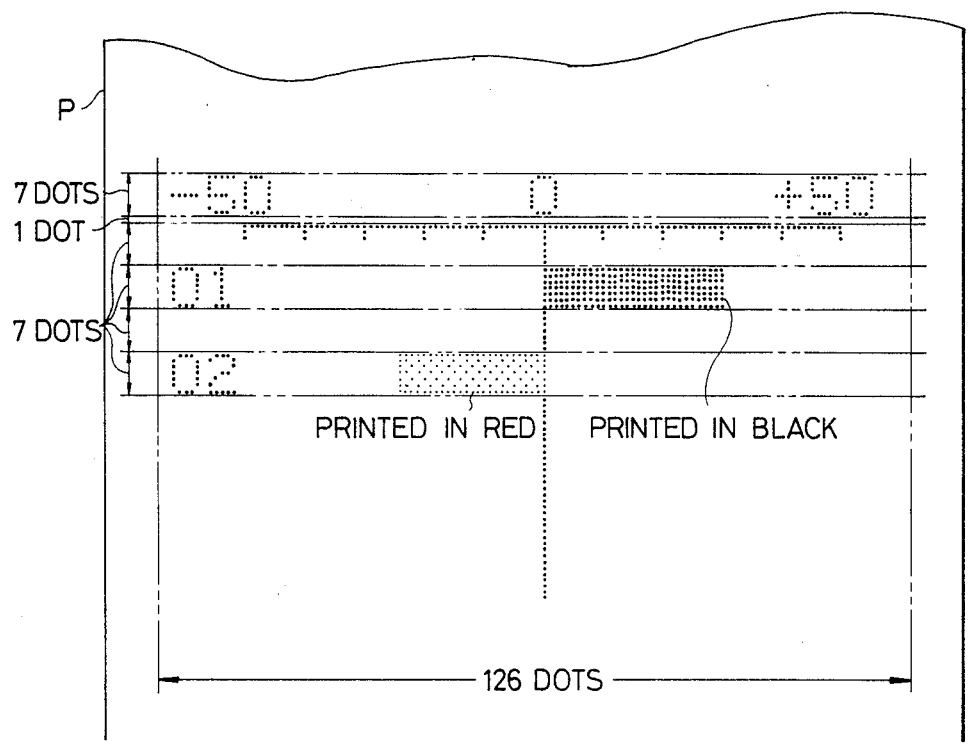
FIG. 9 is a view showing the dot configuration of a graph printed by the second embodiment of the present invention.

Referring to FIGS. 7 and 8, when a print mode switch SW2 on a keyboard KB is switched from the normal printing mode to the graph printing mode, a control section CC detects that the printing mode has been switched to the graph mode through a signal line $l_S$. Then, the function keys on the keyboard KB are switched for graph data input. Graph printing is performed by groups of dots. Each printing line comprises a matrix of 126×7 dots, as shown in FIG. 9. Each of the printing memories PCM1 and PCM2 in FIG. 8 has a capacity of 126 bytes, each byte comprising 8 bits corresponding to printing data of 1×7 dots. The printing memory PCM1 is assigned for printing in black, while the printing memory PCM2 is assigned for printing in red, thereby allowing printing in black and red.

The keys [0] and [≛], the keys [5], [0], [⊞], and [≛], and the keys [5], [0], [⊟], and [≛] are depressed to input a target value of 0, a maximum positive numeral of 50, a maximum negative numeral of −50, and the graph data printing mode instruction, respectively. Then, the control section CC recognizes from the first three data inputs after the switching operation of the printing mode switch SW2 that the current mode is the scale numeral printing mode. The control section CC stores together with data of spaces the dot patterns representing the above input data to predetermined addresses of the printing memory PCM1. The control section CC also stores the dot patterns representing spaces in the printing memory PCM2.

The above operation is performed in the following manner. Firstly, the numeral 125 is set in a printing dot register PR through a signal line $l_{PR}$. A printing dot counter PC and a line counter LC are cleared through a signal line $l_C$. An output signal line $l_{AD}$ of the dot counter PC is an address signal line for the printing memories PCM1 and PCM2. A signal line $l_{A1}$ is set to logic level "1" to turn on an AND gate AD1 so that printing data on a data signal line DB1 may appear on a signal line DB2. This printing data is stored in the printing memory PCM1 by setting a black read/write signal line $l_{RW1}$ to logic level "0". The contents of the printing dot register PR and the printing dot counter PC are compared. If they do not coincide, the count of the dot counter PC is incremented by one through a signal line $l_{PC}$, and the next 1-byte printing data of 1×7 dots is stored in the printing memory PCM1. This operation is repeated until the contents of the printing dot counter PC and the printing dot register PR coincide, thereby storing the graph data of 126 bytes.

Meanwhile, 126-byte printing data of logic level "0", that is, the dot patterns representing spaces, is also stored in the printing memory PCM2 by setting a signal line $l_{A2}$ to logic level "0" to turn off an AND gate AD2 and by setting a red read/write signal line $l_{RW2}$ to logic level "0".

Figures 10A, 10B, 10C:
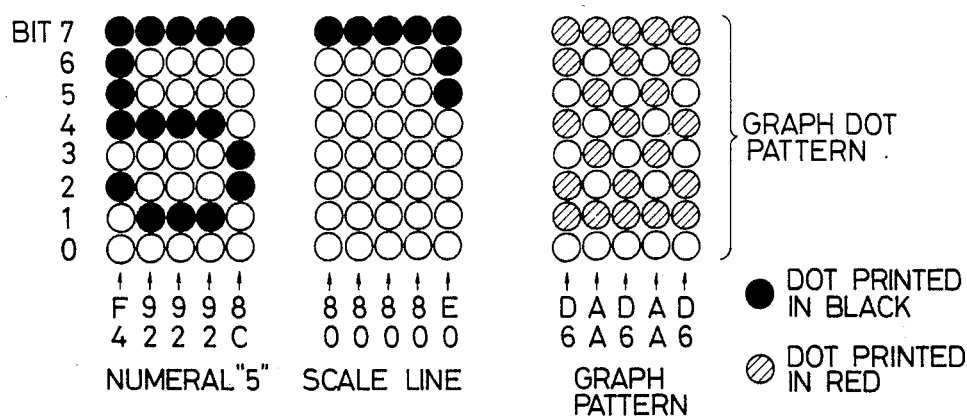
FIGS. 10(A) to 10(C) are views showing examples of dot configuration of individual characters printed by the second embodiment of the present invention.

The printing data is stored in the printing memories PCM1 and PCM2 in units of bytes, each byte comprising 8 bits corresponding to printing data of 1×7 dots. The printing data is dot pattern data generated by a character generator CG in the control section CC. Each dot pattern of 1×7 dots is expressed in hexadecimal notation. Taking the numeral 5 and a staggered pattern of a scale line " " as shown in FIG. 9, the numeral 5 is represented by "8C", "92", "92", "92" and "F4" from the right in hexadecimal notation as shown in FIG. 10(A), while the staggered pattern "· · ·· ··" is represented by "E0", "80", "80", "80", and "80" as shown in FIG. 10(B). In FIGS. 10(A) and 10(B), black circles represent dots printed in black, while hatched circles represent dots printed in red.

In the case under discussion of printing scale numerals, data of numerals −50, 0 and 50 is printed. The contents of the printing memories PCM1 and PCM2 have formats as shown in FIG. 11A. The printing data stored in the printing memories PCM1 and PCM2 is transferred to the printer control section PCC and the printer is operated to perform printing.

The mode of operation will now be described with reference to FIG. 9. In the second embodiment, the printer is an ink jet printer wherein paper feed is performed by a pulse motor PM, ink jet nozzles of the on-demand type for printing in black and red are horizontally mounted on a carriage driven by a linear motor LM, and the driver circuit PZD is driven by a timing pulse TP generated by a carriage position sensor FDP during reciprocative movement of the carriage.

When the printing data is stored in the printing memories PCM1 and PCM2 in this manner, the control section CC clears the printing dot counter PC and the line counter LC to initialize the addresses of the printing memories PCM1 and PCM2 by setting the signal line $l_C$ to logic level "0". After setting the black and red read/write signal lines $l_{RW1}$ and $l_{RW2}$ to logic level "1" (read state) and confirming that a busy signal line $l_{Bsy}$ from the printer control section PCC is at logic level "1" (not in the busy state), the control section CC sets a signal line $l_{PF}$ to logic level "1" and a signal line $l_{PB}$ to logic level "0" to instruct the printer control section PCC to start printing. Then, the printer control section PCC sets the busy signal line $l_{Bsy}$ to logic level "0" (busy state), sets a drive signal line $l_F$ of the linear motor LM to logic level "1", and sets a drive signal line $l_B$ to logic level "0" so as to drive the carriage toward the left from its home position (right-hand position on a printing paper sheet P). During this time period, the timing pulses TP from the carriage position sensor FDP are detected. In response to the timing pulse immediately next to that corresponding to the printing start position, the printer control section PCC sets the signal line $l_{Bsy}$ to logic level "1" so as to signal to the control section CC that the printing data may be transmitted. In response to this, the control section CC sets a signal line $l_{REQ}$ to logic level "0" to signal to the printer control section PCC that the data on data lines $D_{P1}$ and $D_{P2}$ is valid. Then, the printer control section PCC sets the signal line $l_{Bsy}$ to logic level "0" (busy state) to allow write of printing data into the printing memories PCM1 and PCM2. In response to the next timing pulse TP, the driver circuit PZD is driven through the signal lines $l_{B1}$ and $l_{R1}$ to print in black and red in accordance with the state of the most significant bit of first byte of the 126×7 dot matrix. Since the printing data is "00" for black and red as shown in FIG. 11A, a space is printed. When this printing is completed, the printer control section PCC sets the signal line $l_{Bsy}$ to logic level "1" to signal to the control section CC that the next printing data may be transmitted. Then, the control section CC increments the printing dot counter PC by one through the signal line $l_{PC}$ to increment the addresses of the printing memories by one. The next printing data is supplied to the data signal lines $D_{P1}$ and $D_{P2}$. The control section CC sets the signal line $l_{REQ}$ to logic level "0" to indicate that the data on the data signal lines $D_{P1}$ and $D_{P2}$ is valid. The printer control section PCC reads the data from the printing memories PCM1 and PCM2 and performs printing in response to the next timing pulse.

In this manner, the data of the most significant bit of each 1×7 dot pattern, that is, the first row of the 126×7 dot matrix, is printed to the left. During this time period, a coincidence circuit CO monitors coincidence between the contents of the printing dot counter PC which is incremented by one upon every printing operation and of the printing dot register PR. When coincidence occurs, the control section CC detects completion of printing of first 126 dots, clears the contents of the printing dot register PR through the signal line $l_{PR}$, and sets the signal lines $l_{PF}$ and $l_{PB}$ to logic levels "0" and "1", respectively. Subsequently, the printer control section PCC sets the busy signal line $l_{Bsy}$ to logic level "0", and the drive signal lines $l_F$ and $l_B$ to logic levels "0" and "1", respectively so as to drive the carriage to the right and to start printing to the right. The pulse motor PM is driven to feed the printing paper sheet by one dot pitch. As in the case of printing to the left, in response to the timing pulse immediately next to that corresponding to the printing start position, the printer control section PCC sets the busy signal line $l_{Bsy}$ to logic level "1" to signal to the control section CC that the printing data may be transmitted. The control section CC then sets the signal line $1_{REQ}$ to logic level "0" to indicate that the initial data for printing the second row to the right, that is, the 126th dot, is valid. Then, the printer control section PCC receives the printing data and executes printing in response to the next timing pulse TP. Thereafter, the printer control section PCC sets the busy signal line $1_{Bsy}$ to logic level "1" to indicate that the next printing data may be transmitted. Since the next printing must be performed to the right-hand side, the control section CC decrements by one the count of the printing dot counter PC to thereby decrement the printing memory address by one. The control section CC transfers the data of the 125th dot to the data lines $D_{P1}$ and $D_{P2}$, sets the signal line $1_{REQ}$ to logic level "0", and performs printing in response to the next timing pulse TP. In this manner, the second row of the 126×7 dot matrix of black and red printing data is printed to the right. As in the case of printing the first row, when the coincidence of the printed dot number with 126 dots is detected by the coincidence circuit CO, the control circuit CC increments by one the count of the line counter LC through a signal line $l_1$. An output signal line $l_2$ of the line counter LC is for detecting if four reciprocative printing operations of the carriage have been completed, that is, if one line has been printed. Since only one reciprocative movement has been completed in this case, no output is produced from the output signal line $l_2$ in this case. The control section CC sets the printing dot register PR to 125, and sets the signal lines $1_{PF}$ and $1_{PB}$ to logic levels "1" and "0" to instruct printing of the third row of the 126×7 dot matrix. In response to this, the printer control section PCC sets the busy signal line $1_{Bsy}$ to logic level "0" to perform paper feed of one dot pitch and sets the drive signal lines $1_B$ and $1_F$ of the linear motor LM to logic levels "1" and "0" to perform the printing to the left. The printing direction is reversed when the coincidence circuit CO detects another coincidence of the printed dot number with 126 dots. In this manner, four reciprocative movements of the carriage, that is, printing of one line, are completed. When printing of one line is completed, the control section CC receives an output from the output signal line $l_2$ of the line counter LC to thereby detect that the 126×7 dot matrix, or one line, is completed.

Since the scale numerals have been printed, the control section CC, referring to the busy signal line $1_{Bsy}$, instructs to the printer control section PCC through a signal line $1_{FD}$ to perform paper feed of one dot pitch. In response to this, the printer control section PCC performs paper feed of one dot pitch. Subsequently, the control section CC stores the data of the scale lines to the printing memories PCM1 and PCM2, as shown in FIG. 11B. Since printing of the scale lines involves only printing in black, data of logic level "0" is stored in the printing memory PCM2 corresponding to printing in red. In the same manner as printing of the scale numerals, printing of the contents in the printing memory PCM1 corresponding to printing in black is executed by four reciprocative movements of the carriage, thus completing scale line printing instructed by input through the keys [0] and [±] ; the keys [5], [0], [+], and [±] ; and the keys [5], [0], [−], and [±].

When the keys [3], [0], [+] and [±] are depressed to enter the graph printing data, the control section CC judges that the graph printing mode is initiated. Since the printing is detected to be in the positive direction by the entry of the key [+] , the control section CC calculates the print start position with reference to the printing position of the scale numeral +50. The printing position of the scale numeral +50 is the 50th dot to the right from the central scale line, and the printing position of a bar for +30 is the 30th dot to the right from the central scale line, as shown in FIG. 9. On a 126 dot row, 30 dots are printed in black from the 32nd dot from the right side of the printing paper sheet P. Since the printing is to be performed in the positive direction, the printing data is stored in the printing memory PCM1 together with the item (01 in FIG. 9). Since printing in red is not performed in the graph printing (in the negative direction), data of spaces for 126 dots is stored in the printing memory PCM2, as shown in FIG. 11C.

After the graph printing data is stored in the printing memories PCM1 and PCM2 in this manner, the control section CC executes printing by four reciprocative movements of the printer carriage as in the case of printing of the scale numerals. Thus, the graph is printed solid as in the case of item 01 in FIG. 9. When printing is completed, the control section CC stores the data on the central scale line together with data of spaces in the printing memory PCM1 and also stores the data corresponding to spaces in the printing memory PCM2, as shown in FIG. 11D. Printing of the central scale line is completed by the four reciprocative movements as described above. When the keys [2], [5], [−] and [±] are depressed to enter the graph printing data, the control section CC recognizes the graph printing mode and printing in the negative direction by the entry of the key [−] . The control section CC calculates the printing position with reference to the scale numeral −50. The printing position of the scale numeral −50 is the 50th dot to the left from the central scale line, and the printing position is calculated to be the 25th dot to the left from the central scale line. On a 126 dot row, the spaces continue for 61 dots from the right side of the printing paper sheet P, the central scale line is printed at the 62nd dot, and the bar for −25 is printed from the 63rd dot to the 87th dot, the spaces continue from the 88th dot to the 113th dot, and finally, the item 02 is printed.

The printing data as described above is stored in the printing memories PCM1 and PCM2 separately. Since printing is to be performed in the negative direction, the graph printing data from the 63rd dot to the 87th dot is stored in the printing memory PCM2, wherein the 63rd dot to the 86th dot correspond to the graph staggered pattern, and the 87th dot corresponds to the vertical line. The central scale line at the 62nd line and the item data are stored in the printing memory PCM1, as shown in FIG. 11E. The control section CC performs printing by the four reciprocative movements of the printer carriage to print the red staggered pattern of 25 dots in the negative direction. Thereafter, the central scale line is printed in a similar manner to complete printing of the graph printing data.

When the keys [2], [+] , and [±] are entered, printing of item 03 is similarly performed as shown in FIG. 9. When the keys [4], [0], and [±] are entered, the graph printing of item 04 as shown in FIG. 9 is performed.

The numbers of items 01 to 04 are produced from the counter incorporated inside the control section CC.

According to the embodiment as described above, a reference value or a target value is set at the center. If the input data exceeds the reference value, data is printed in black to the right of the reference value. If, on the other hand, the input data is below the reference value, it is printed in red to the left of the reference value. In this manner, the polarity of each item may be indicated easily so that the current status with reference to the target value may be readily evaluated to improve the working efficiency and the like.

What I claim is:

1. A serial dot printer comprising:
   memory means including a first memory region for storing recording information of a first recording color, and a second memory region for storing information of a second recording color which is different from the first recording color;
   recording means for conducting a reocrding on the basis of the recording information stored in said memory means;
   input means for inputting numerical value information;
   means including a plurality of instruction units for instructing input of a plurality of kinds of function information; and
   control means for controlling said recording means on the basis of the recording information in the first memory region when the control means inputs the information from the input means and one of the instruction units, and for controlling said recording means on the basis of the recording information in the second memory region of the memory means when the control means input information from said input means, and at least two of the instruction units.

2. A printer according to claim 1, wherein said first memory region stores numerical value information and scale information, and said second memory region stores information of a picture formed by a predetermined dot pattern different from numeral patterns and has a length corresponding to a type of said numerical value information.

3. A printer according to claim 2, wherein said predetermined dot pattern stored in said second memory region forms a staggered pattern.

4. A printer according to claim 2 or 3, wherein said control means controls said recording means for recording the numerical value information stored in the first memory region overlapping a record of bar graph picture information stored in said second memory region.

5. A printer according to claim 1, wherein said printing means comprises a first ink jet printer for printing the first printing color and a second ink jet printer for printing the second printing color.

6. A serial dot printer comprising:
   memory means including a first memory region for storing recording information of a first recording color, and a second memory region for storing information of a second recording color which is different from the first recording color;
   recording means for conducting a recording on a recording medium in according with the recording information stored in said memory means;
   input means for inputting numerical value information;
   first instruction means for instructing an input of a first function information;
   second instruction means for instructing an input of a second function information; and
   control means for controlling said recording means on the basis of the recording information in the first memory region when the control means inputs the information from the input means and the first instruction means, and for controlling said recording means on the basis of the recording information in the first or second memory region of the memory means when the control means inputs information from said input means, and said first and second instruction means.

7. A printer according to claim 6, wherein value information, scale information, and an information of a picture formed by a predetermined dot pattern different from numeral patterns and having a length corresponding to a first type of said numerical value information, and
   said second memory region stores information of a picture formed by a predetermined dot pattern different from numeral patterns and having a length corresponding to a second type of said numerical value information.

8. A printer according to claim 7, wherein the predetermined dot pattern stored in said second memory region forms a staggered pattern.

9. A printer according to claim 7 or 8, wherein said control means controls said printing means for printing a bar graph on the recording medium in one direction from a reference position on the basis of the picture information stored in the first memory region when the control means inputs numerical value information from the input means, a positive value representing information from the first instruction means, and the function information from the second instruction means, and controls said printing means for printing bar graph on the printing medium in the other direction from the reference position on the basis of the picture information stored in said second memory region when the control means inputs numerical value information from the input means, negative value representing information from the first instruction means, and the function information from the second instruction means.

10. A printer according to claim 6, wherein said printing means comprises a first ink jet printer for printing the first printing color and a second ink jet printer for printing the second printing color.

11. A serial dot printer comprising:
    means for inputting first numerical value information and second numerical value information;
    means for instructing an input of function information;
    information generation means for storing a predetermined dot pattern different from numeral patterns so as to generate picture information corresponding to the numerical value information inputted by said input means;
    means for conducting a recording on a recording medium on the basis of the picture information generated by said information generation means; and
    means, responsive to the inputs from said input means and said instruction means, for controlling said recording means to conduct a recording of first graph information on the recording medium from a reference position in a predetermined direction on the basis of the picture information read out from said information generation means when the first numerical value information is inputted, and to conduct a recording of second graph information on the recording medium from the reference position in the predetermined direction such that at least a part of the second graph information overlaps the first graph information on the basis of the picture information read out from said information generation means when the second numerical value information is inputted.

12. A serial dot printer according to claim 11, wherein said controlling means utilizes a dot pattern to form graph information and wherein the number of dots of the dot pattern to be used for forming the second graph information is larger than the number of dots of the dot pattern to be used for forming the first graph information.

13. A serial dot printer according to claim 12, wherein the dot pattern used for forming the first graph information forms a frame of a bar graph, and the dot pattern used for forming the second graph information forms a staggered pattern.

14. A serial dot printer comprising:
means for inputting first numerical value information and second numerical value information;
means for instructing an input of function information;
information generation means for storing a predetermined dot pattern different from numeral patterns so as to generate picture information corresponding to the numerical value information inputted by said input means;
means for conducting a recording on a recording medium on the basis of the picture information generated by said information generation means; and
means, responsive to the inputs from said input means and said instruction means, for controlling said recording means to conduct a recording of first graph information on the recording medium from a reference position in a predetermined direction on the basis of the picture information read out from said information generation means when the first numerical value information is inputted, and to conduct a recording of second graph information on the recording medium from the reference position in a direction opposite to the predetermined direction on the basis of the picture information read out from said information generation means when the second numerical value information is inputted.

15. A serial dot printer according to claim 14, wherein said controlling means utilizes a dot pattern to form graph information and wherein the dot pattern used for forming the first graph information is formed in a first recording color, and the dot pattern used for forming the second graph information is formed in a second recording color different from the first recording color.

16. A serial dot printer comprising:
means for inputting first and second numerical value information;
means for instructing an input of function information;
information generation means for storing a predetermined bar-graph pattern different from numerals so as to generate picture information corresponding to the numerical value information inputted by said means for inputting;
arithmetic output means for calculating a ratio of the second numeric value information to the first numeric value information inputted by said means for inputting and for outputting a result of the calculation as a numeral and as a percentage;
recording means for recording the picture information generated by said information generation means and the numeral representing the result of the calculation outputted by said arithmetic output means respectively on a recording medium;
controlling means, responsive to inputs from said means for inputting and said instruction means, for controlling said recording means so as to conduct recording of a first graphic display corresponding to the first numerical value information and a second graphic display corresponding to the second numerical value information on the basis of the graphic information read out from said information generation means with the first and second graphic displays overlapped at at least a portion thereof, further to conduct a recording of the numeral and the percentage display outputted from said arithmetic output means on areas surrounded by said first and second graphic displays.

17. A serial dot printer according to claim 16, wherein the printing color for said first and second graphic displays printed by said recording means is different from that for said numeral and said percentage display.

* * * * *

UNITED STATES PATENT AND TRADEMARK OFFICE
CERTIFICATE OF CORRECTION

PATENT NO. : 4,583,100
DATED : April 15, 1986
INVENTOR(S) : SHIGEMITSU TAZAKI

It is certified that error appears in the above-identified patent and that said Letters Patent is hereby corrected as shown below:

Column 3, line 46, after "$1_{RW2}$" insert --to--.

Claim 1, line 7 (Column 11, line 13), change "reocrding" to --recording;

line 22 (Column 11, line 28), change "input" to --inputs.

Signed and Sealed this

Twelfth Day of August 1986

[SEAL]

Attest:

DONALD J. QUIGG

Attesting Officer

Commissioner of Patents and Trademarks